(12) United States Patent
Chen

(10) Patent No.: US 10,192,698 B2
(45) Date of Patent: Jan. 29, 2019

(54) INPUT DEVICE WITH ADJUSTABLE FORCE LEVEL

(71) Applicant: Primax Electronics Ltd., Taipei (TW)

(72) Inventor: Chung-Yuan Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/824,320

(22) Filed: Nov. 28, 2017

(65) Prior Publication Data

US 2018/0166229 A1    Jun. 14, 2018

Related U.S. Application Data

(60) Provisional application No. 62/431,541, filed on Dec. 8, 2016.

(51) Int. Cl.
| | | |
|---|---|---|
| *H01H 13/20* | (2006.01) | |
| *H01H 13/04* | (2006.01) | |
| *H01H 13/14* | (2006.01) | |
| *G06F 3/02* | (2006.01) | |
| *H01H 13/705* | (2006.01) | |
| *H01H 13/85* | (2006.01) | |
| *G06F 3/0354* | (2013.01) | |

(52) U.S. Cl.
CPC ............ *H01H 13/20* (2013.01); *G06F 3/02* (2013.01); *G06F 3/0202* (2013.01); *H01H 13/04* (2013.01); *H01H 13/14* (2013.01); *H01H 13/705* (2013.01); *H01H 13/85* (2013.01); *G06F 3/03543* (2013.01); *H01H 2233/07* (2013.01)

(58) Field of Classification Search
CPC .......... H01H 13/20; H01H 13/14; G06F 3/02; G06F 3/0202
See application file for complete search history.

(56) References Cited

U.S. PATENT DOCUMENTS

| | | | | |
|---|---|---|---|---|
| 5,120,923 A | * | 6/1992 | Kato | H01H 13/705 |
| | | | | 200/341 |
| 5,634,375 A | * | 6/1997 | Schnapp | F16H 59/70 |
| | | | | 200/61.91 |
| 5,715,932 A | * | 2/1998 | Motoyama | H01H 13/50 |
| | | | | 200/345 |
| 2005/0034965 A1 | * | 2/2005 | Uehira | G05G 1/087 |
| | | | | 200/341 |
| 2005/0093663 A1 | * | 5/2005 | Raymond | G01D 5/02 |
| | | | | 335/220 |
| 2006/0291964 A1 | * | 12/2006 | Wang | H01H 35/245 |
| | | | | 406/12 |

* cited by examiner

*Primary Examiner* — Kyung S Lee
(74) *Attorney, Agent, or Firm* — Muncy, Geissler, Olds & Lowe, P.C.

(57) ABSTRACT

An input device with an adjustable force level is provided. The input device includes a circuit board and a key structure. The key structure includes a key body, a casing and a pressure-adjustable elastic receptacle. The pressure-adjustable elastic receptacle is partially or completely accommodated within the casing and sustaining the key body. When the key body is moved downwardly, a resisting force to resist the key body is provided by the pressure-adjustable elastic receptacle and the force level of the resisting force is adjusted by the user. When a force with the force level is applied to the key body by the user, a switch of the circuit board is triggered.

6 Claims, 6 Drawing Sheets

INPUT DEVICE WITH ADJUSTABLE FORCE LEVEL

CROSS-REFERENCE TO RELATED APPLICATION

This application claims priority to U.S. Provisional Patent Application No. 62/431,541 filed Dec. 8, 2016, the contents of which are incorporated herein by reference.

FIELD OF THE INVENTION

The present invention relates to an input device, and more particularly to an input device with an adjustable force level.

BACKGROUND OF THE INVENTION

As known, keyboards and mouse devices are indispensable devices for people in the modern society to operate computers. Generally, each of the keyboard and the mouse has plural keys on the top surface. The user may press the keys to input commands. Conventionally, in the keyboard and the mouse, many kinds of keys are designed to generate key signals. For example, a mechanical key uses conductive pins to trigger a multi-stage switch to generate a key signal. In addition, an optical key generates a key signal according to the result of receiving or obstructing a sensing light.

However, the above key designs still have some drawbacks. For example, the force level of a resisting force to resist the pressing action of the key and the predetermined force level for triggering the key are set before the keyboard or the mouse leaves the factory. That is, the force level cannot be adjusted by the user. Consequently, the conventional keyboard and the conventional mouse cannot meet the requirements of different users (e.g., children and adults). For example, it is laborious for the children to press the key, but the feedback force level is insufficient to the adult. In other words, the conventional input device needs to be further improved.

SUMMARY OF THE INVENTION

The present invention provides an input device with an adjustable force level. A pressure-adjustable elastic receptacle is accommodated within a casing and contacted with a key body. The pressure within the pressure-adjustable elastic receptacle is adjustable. When the key structure is pressed down to a triggered position, a resisting force to resist the key structure is provided by the pressure-adjustable elastic receptacle.

In accordance with an aspect of the present invention, there is provided an input device with an adjustable force level. The input device includes a circuit board and a key structure. The circuit board includes a switch. The key structure is located over the circuit board. The key structure includes a key body, a casing and a pressure-adjustable elastic receptacle. The key body includes a keycap and a triggering element. The triggering element is connected with the keycap. The casing is located under the keycap and assembled with the circuit board. The triggering element is inserted into an inner portion of the casing. The pressure-adjustable elastic receptacle is partially or completely accommodated within the casing and contacted with the key body. The pressure-adjustable elastic receptacle includes a pressure-adjusting opening. A pressure within the pressure-adjustable elastic receptacle is set through the pressure-adjusting opening. When the key body is pressed down, a resisting force to resist the key body is provided by the pressure-adjustable elastic receptacle according to the pressure within the pressure-adjustable elastic receptacle. When the key structure is pressed down to a triggered position by a user, the switch of the circuit board is triggered by the triggering element.

In an embodiment, the circuit board includes a perforation, and the casing further includes a protrusion part. The protrusion part is penetrated through the perforation. Consequently, the casing is positioned on the circuit board. When the triggering element is moved downwardly to the triggered position, the switch of the circuit board is pressed by the triggering element.

In an embodiment, a fluid channel is formed in the protrusion part of the casing, and the pressure-adjusting opening is in communication with the fluid channel. The pressure within the pressure-adjustable elastic receptacle is set through the fluid channel.

In an embodiment, the key body further includes a movable position-limiting post, and the movable position-limiting post is connected with the keycap. When the keycap is pressed down by the user, the movable position-limiting post is moved downwardly along a position-limiting groove of the casing. The pressure-adjustable elastic receptacle is disposed within the position-limiting groove and contacted with a distal end of the movable position-limiting post.

In an embodiment, the casing includes an accommodation space between the keycap and the circuit board, and the pressure-adjustable elastic receptacle is accommodated within the accommodation space.

In an embodiment, the pressure-adjusting opening is in communication with a fluid channel of the circuit board, and the pressure within the pressure-adjustable elastic receptacle is set through the fluid channel.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
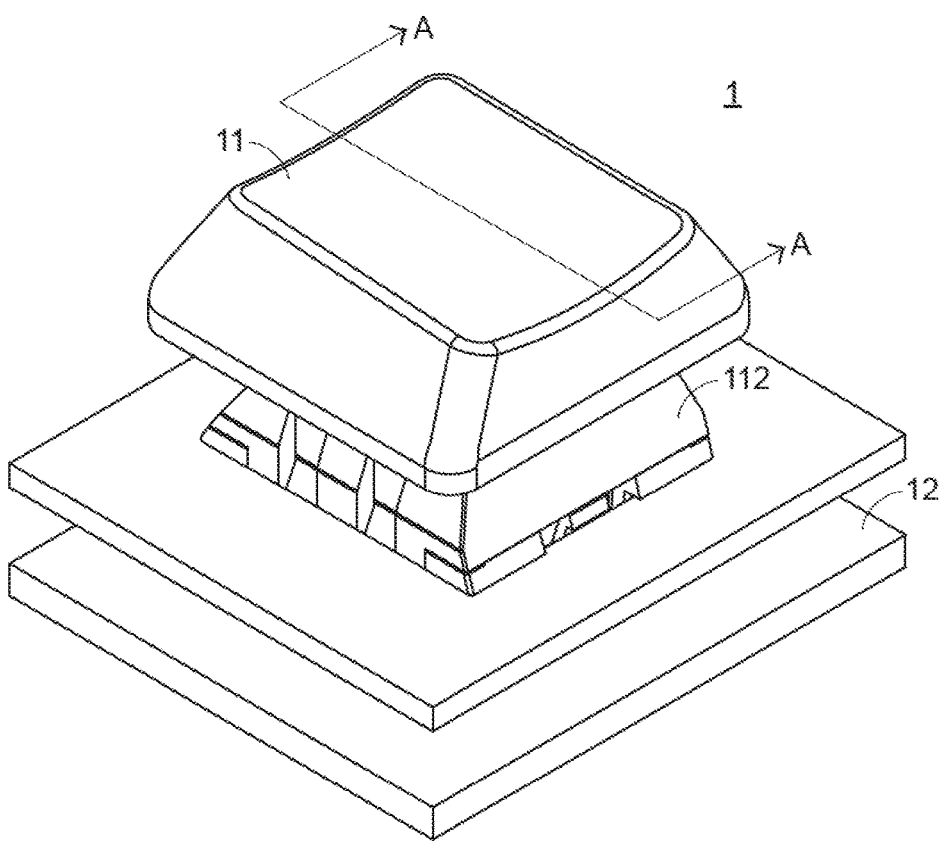
FIG. 1 is a schematic perspective view illustrating an input device with an adjustable force level according to a first embodiment of the present invention.

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown. For well understanding the present invention, the elements shown in the drawings are not in scale with the elements of the practical product.

Figure 2:
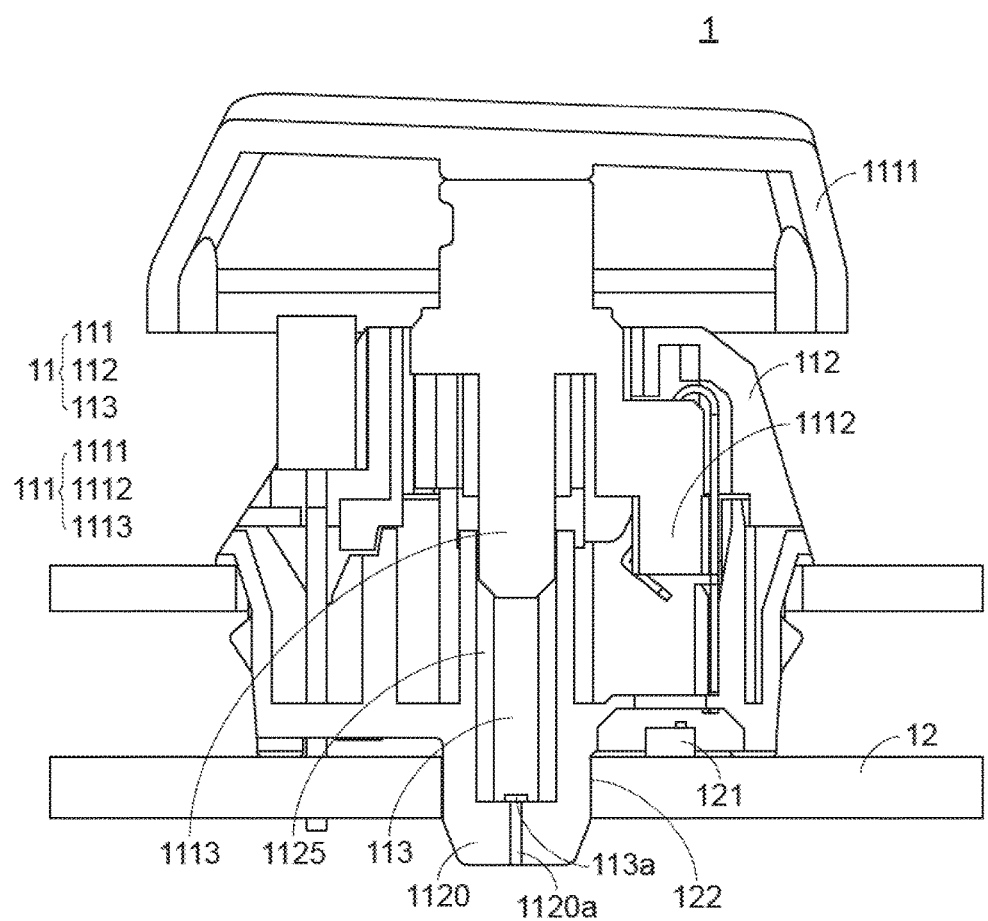
FIG. 2 is a schematic cross-sectional view illustrating the input device of FIG. 1 and taken along the line A-A, in which the input device is in an initial position.
Figure 3:
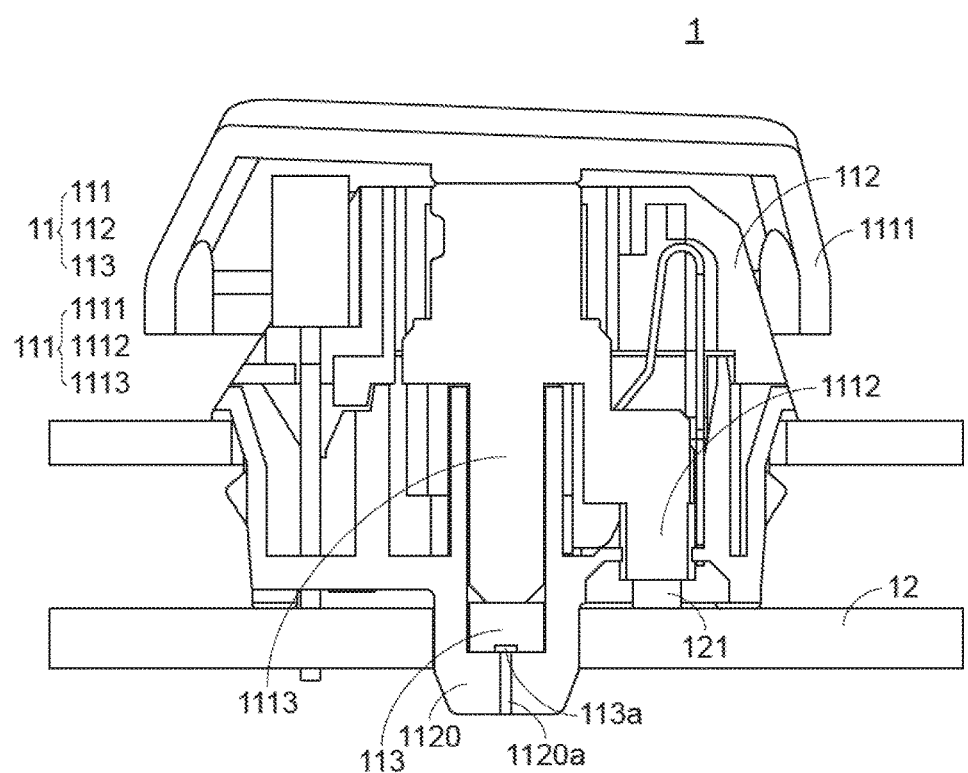
FIG. 3 is a schematic cross-sectional view illustrating the input device of FIG. 1 and taken along the line A-A, in which the input device is in a pressed position.

Please refer to FIGS. 1, 2 and 3. FIG. 1 is a schematic perspective view illustrating an input device with an adjustable force level according to a first embodiment of the present invention. FIG. 2 is a schematic cross-sectional view illustrating the input device of FIG. 1 and taken along the line A-A, in which the input device is in an initial position. FIG. 3 is a schematic cross-sectional view illustrating the input device of FIG. 1 and taken along the line A-A, in which the input device is in a pressed position. In this embodiment, the input device 1 is a keyboard. For succinctness, only a portion of the keyboard (e.g., the portion containing a single key structure 11) will be described. In this embodiment, the input device 1 comprises a circuit board 12 and a key structure 11. The key structure 11 is disposed on a top surface of the circuit board 12. In an embodiment, the key structure 11 comprises a key body 111, a casing 112 and a pressure-adjustable elastic receptacle 113.

The key body 111 comprises a keycap 1111, a triggering element 1112 and a movable position-limiting post 1113. The triggering element 1112 and the movable position-limiting post 1113 are connected with the keycap 1111. Preferably, the triggering element 1112, the movable position-limiting post 1113 and the keycap 1111 are integrally formed. The keycap 1111 is exposed to a top side of the casing 112. Consequently, the keycap 1111 can be pressed down by a user from the top side. The casing 112 is assembled with the circuit board 12. Moreover, a waterproof ring (not shown) is arranged between the casing 112 and the circuit board 12 for preventing foreign liquid from entering the casing 112. The triggering element 1112 is inserted into an inner portion of the housing 112. When the key structure 11 is pressed down to a triggered position by the user, an underlying switch 121 is pressed and triggered by the triggering element 1112. In another embodiment, the switch 121 is replaced by a non-contact capacitive switch, a contact capacitive switch, a resistive switch or an optical sensitive switch.

The pressure-adjustable elastic receptacle 113 is partially or completely accommodated within the casing 112. A top end and a bottom end of the pressure-adjustable elastic receptacle 113 are contacted with the key body 111 and the casing 112, respectively. Preferably, the top end and the bottom end of the pressure-adjustable elastic receptacle 113 are contacted with the movable position-limiting post 1113 and the casing 112, respectively. That is, the pressure-adjustable elastic receptacle 113 supports the key body 111 in the upward direction. When no external force is applied to the key body 111, the key body 111 is supported by the pressure-adjustable elastic receptacle 113 and maintained in the initial position.

Moreover, the pressure-adjustable elastic receptacle 113 comprises a pressure-adjusting opening 113a. The pressure within the pressure-adjustable elastic receptacle 113 can be set by the user through the pressure-adjusting opening 113a. Consequently, a resisting force of the pressure-adjustable elastic receptacle 113 to resist the downwardly-moved key body 111 is determined. When the input device 1 of the present invention is used, the pressure within the pressure-adjustable elastic receptacle 113 is adjusted by the user and the force level suitable for the user is obtained for facilitating the user to press the key structure 11. In this embodiment, the movable position-limiting post 1113 of the key body 111 is protruded from the keycap 1111. While the keycap 1111 is pressed down by the user, the movable position-limiting post 1113 is moved downwardly along a position-limiting groove 1125 of the casing 112. The pressure-adjustable elastic receptacle 113 is disposed within the position-limiting groove 1125 and contacted with a distal end of the movable position-limiting post 1113.

The casing 112 comprises a protrusion part 1120. A fluid channel 1120a is formed in the protrusion part 1120. The pressure-adjusting opening 113a of the pressure-adjustable elastic receptacle 113 is in communication with the space of the fluid channel 1120a. Consequently, the pressure within the pressure-adjustable elastic receptacle 113 is set through the fluid channel 1120a. For preventing the gas or liquid from leaking out of the pressure-adjustable elastic receptacle 113, the pressure-adjusting opening 113a is connected with a check valve (not shown). It is noted that the positions and structures of the pressure-adjusting opening 113a and the fluid channel 1120a of the protrusion part 1120 are not restricted. The concepts of the input device of the present invention are expanded to individually adjust the pressure within the pressure-adjustable elastic receptacle 113 of a single key structure or simultaneously adjust the pressures within the pressure-adjustable elastic receptacles 113 of plural key structures. As long as the pressure within the pressure-adjustable elastic receptacle 113 is set through the pressure-adjusting opening 113a, the way of adjusting the pressure is not restricted.

For positioning the key structure 11 on the circuit board 12, the circuit board 12 further comprises a perforation 122 and the casing 112 further comprises the protrusion part 1120. The protrusion part 1120 of the casing 112 is penetrated through the perforation 122 of the circuit board 12. Consequently, the casing 112 is positioned on the circuit board 12. When the triggering element 1112 is moved downwardly to the triggered position, the triggering element 1112 is penetrated through the casing 112 to press the switch 121 of the circuit board 12.

Figure 4:
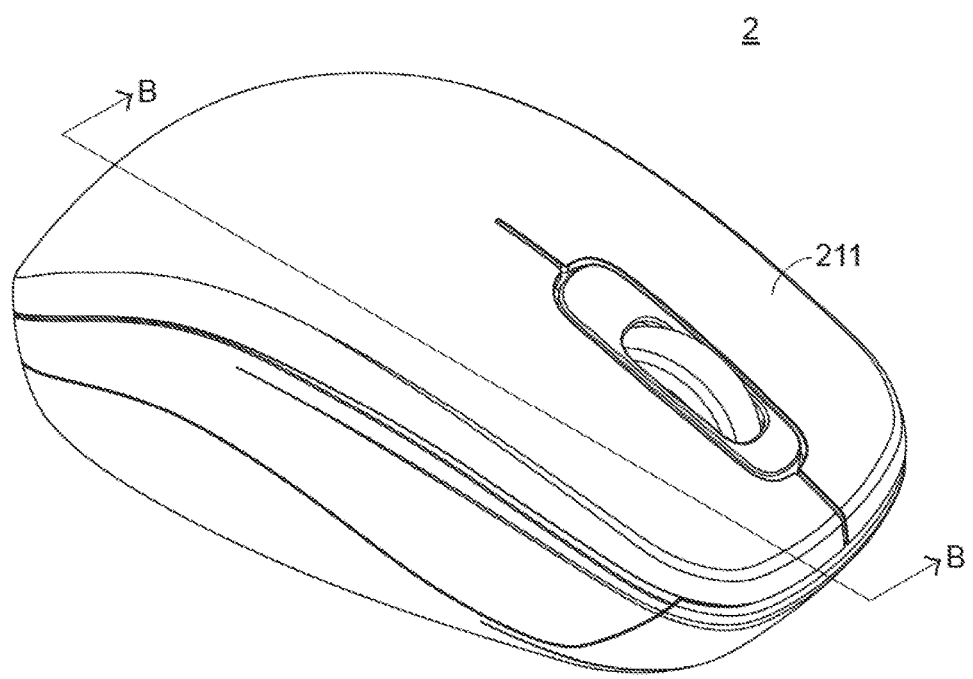
FIG. 4 is a schematic perspective view illustrating an input device with an adjustable force level according to a second embodiment of the present invention.
Figure 5:
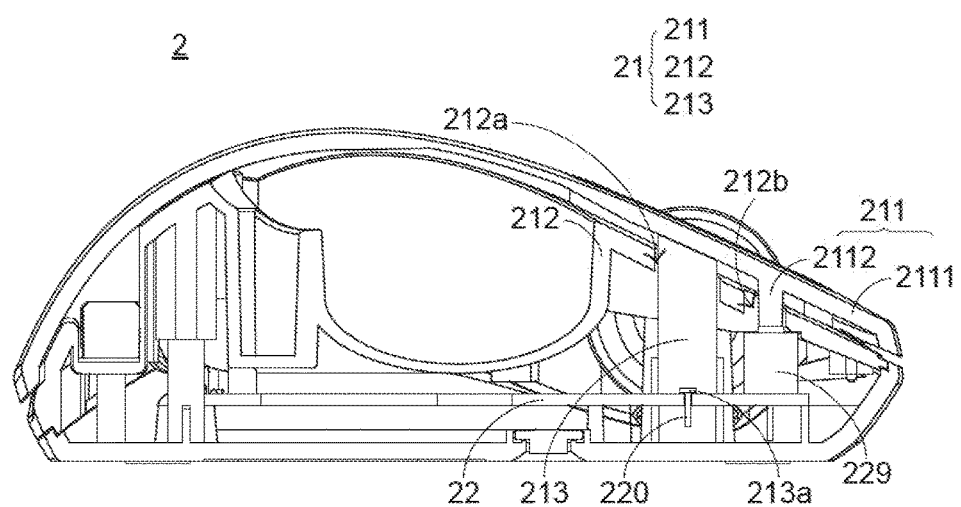
FIG. 5 is a schematic cross-sectional view illustrating the input device of FIG. 4 and taken along the line B-B, in which the input device is in an initial position.
Figure 6:
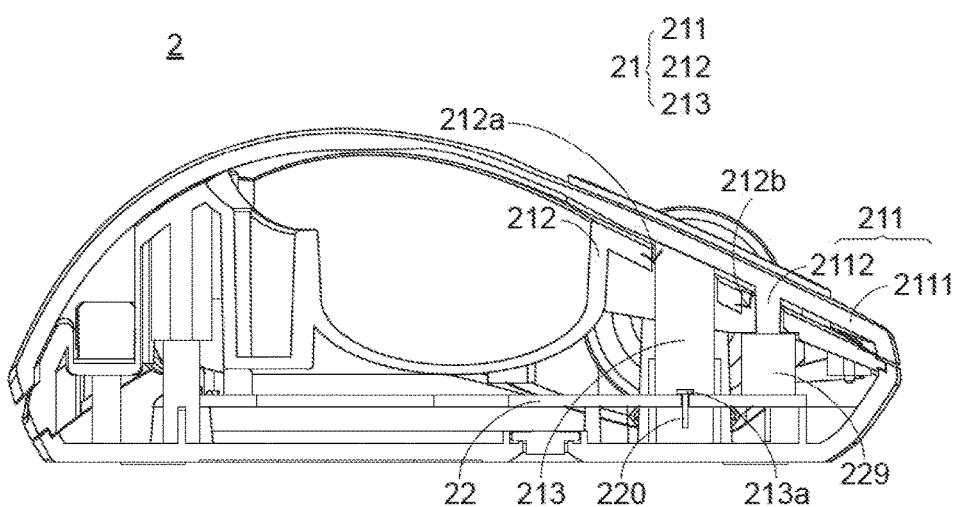
FIG. 6 is a schematic cross-sectional view illustrating the input device of FIG. 4 and taken along the line B-B, in which the input device is in a pressed position.

Please refer to FIGS. 4, 5 and 6. FIG. 4 is a schematic perspective view illustrating an input device with an adjustable force level according to a second embodiment of the present invention. FIG. 5 is a schematic cross-sectional view illustrating the input device of FIG. 4 and taken along the line B-B, in which the input device is in an initial position. FIG. 6 is a schematic cross-sectional view illustrating the input device of FIG. 4 and taken along the line B-B, in which the input device is in a pressed position. In this embodiment, the input device 2 is a mouse. The components of the input device 2 of this embodiment are similar to those of the first embodiment. In this embodiment, the input device 2 comprises a circuit board 22 and a key structure 21. The key structure 21 is disposed on a top surface of the circuit board 22. In an embodiment, the key structure 21 comprises a key body 211, a casing 212 and a pressure-adjustable elastic receptacle 213. The key body 211 comprises a keycap 2111 and a triggering element 2112. The keycap 2111 is connected with the triggering element 2112. The keycap 2111 is exposed to a top side of the casing 112. Consequently, the keycap 2111 can be pressed down by a user. The triggering element 2112 is inserted into an inner portion of the housing 212. The circuit board 22 comprises a switch 229, which is located under the casing 212. When the key structure 21 is pressed down to a triggered position by the user, the switch 229 is triggered by the triggering element 2112.

In this embodiment, the casing 212 of the input device 2 comprises a first accommodation space 212a and a second accommodation space 212*b*. The pressure-adjustable elastic receptacle 213 is accommodated within the first accommodation space 212*a*. The triggering element 2112 of the key body 211 is accommodated within the second accommodation space 212*b*.

The procedure of adjusting the pressure is similar to the first embodiment. However, in this embodiment, the circuit board 220 comprises a fluid channel. The pressure-adjusting opening 213*a* of the pressure-adjustable elastic receptacle 213 is in communication with the space of the fluid channel 220. It is noted that numerous modifications and alterations may be made while retaining the teachings of the invention.

From the above descriptions, the present invention provides an input device with an adjustable force level. The pressure-adjustable elastic receptacle is located under the key structure. When the pressure (e.g., the liquid pressure or the gas pressure) within the pressure-adjustable elastic receptacle is increased or decreased, the resisting force to resist the key structure to be pressed to the triggered position is modified. Consequently, the input device of the present invention is suitably used by different users.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An input device with an adjustable force level, comprising:
    a circuit board comprising a switch; and
    a key structure located over the circuit board, and comprising:
        a key body comprising a keycap and a triggering element, wherein the triggering element is connected with the keycap;
        a casing located under the keycap and assembled with the circuit board, wherein the triggering element is inserted into an inner portion of the casing; and
        a pressure-adjustable elastic receptacle partially or completely accommodated within the casing and contacted with the key body, wherein the pressure-adjustable elastic receptacle comprises a pressure-adjusting opening, and a pressure within the pressure-adjustable elastic receptacle is set through the pressure-adjusting opening, wherein when the key body is pressed down, a resisting force to resist the key body is provided by the pressure-adjustable elastic receptacle according to the pressure within the pressure-adjustable elastic receptacle,
    wherein when the key structure is pressed down to a triggered position by a user, the switch of the circuit board is triggered by the triggering element.

2. The input device according to claim 1, wherein the circuit board comprises a perforation, and the casing further comprises a protrusion part, wherein the protrusion part is penetrated through the perforation, so that the casing is positioned on the circuit board, wherein when the triggering element is moved downwardly to the triggered position, the switch of the circuit board is pressed by the triggering element.

3. The input device according to claim 2, wherein a fluid channel is formed in the protrusion part of the casing, and the pressure-adjusting opening is in communication with the fluid channel, wherein the pressure within the pressure-adjustable elastic receptacle is set through the fluid channel.

4. The input device according to claim 1, wherein the key body further comprises a movable position-limiting post, and the movable position-limiting post is connected with the keycap, wherein when the keycap is pressed down by the user, the movable position-limiting post is moved downwardly along a position-limiting groove of the casing, wherein the pressure-adjustable elastic receptacle is disposed within the position-limiting groove and contacted with a distal end of the movable position-limiting post.

5. The input device according to claim 1, wherein the casing comprises an accommodation space between the keycap and the circuit board, and the pressure-adjustable elastic receptacle is accommodated within the accommodation space.

6. The input device according to claim 1, wherein the pressure-adjusting opening is in communication with a fluid channel of the circuit board, and the pressure within the pressure-adjustable elastic receptacle is set through the fluid channel.

* * * * *